(12) United States Patent
Dempster et al.

(10) Patent No.: US 10,408,481 B2
(45) Date of Patent: *Sep. 10, 2019

(54) SYSTEMS AND METHODS TO CONTROL ENERGY CONSUMPTION EFFICIENCY

(71) Applicant: Optimum Energy LLC, Seattle, WA (US)

(72) Inventors: Ian Dempster, Seattle, WA (US); Ben Erpelding, San Diego, CA (US); James Hanna, Seattle, WA (US)

(73) Assignee: Optimum Energy LLC, Seattle, WA (US)

(*) Notice: Subject to any disclaimer, the term of this patent is extended or adjusted under 35 U.S.C. 154(b) by 319 days.

This patent is subject to a terminal disclaimer.

(21) Appl. No.: 14/693,722

(22) Filed: Apr. 22, 2015

(65) Prior Publication Data
US 2015/0226446 A1 Aug. 13, 2015

Related U.S. Application Data

(63) Continuation of application No. 13/494,432, filed on Jun. 12, 2012, now abandoned, which is a continuation of application No. 12/609,452, filed on Oct. 30, 2009, now Pat. No. 8,219,250.

(60) Provisional application No. 61/110,353, filed on Oct. 31, 2008.

(51) Int. Cl.
*F24F 11/30* (2018.01)
*G05B 15/02* (2006.01)
*F24F 11/62* (2018.01)

(52) U.S. Cl.
CPC .............. *F24F 11/30* (2018.01); *F24F 11/62* (2018.01); *G05B 15/02* (2013.01); *G05B 2219/2642* (2013.01)

(58) Field of Classification Search
None
See application file for complete search history.

(56) References Cited

U.S. PATENT DOCUMENTS

| 5,481,481 A * | 1/1996 | Frey ................... G05B 19/0421 340/3.1 |
| 5,735,134 A * | 4/1998 | Liu ......................... F25B 49/02 62/183 |
| 5,924,486 A * | 7/1999 | Ehlers .................... F24F 11/006 165/238 |
| 6,185,946 B1 * | 2/2001 | Hartman ............... F04D 15/029 236/1 EA |

(Continued)

*Primary Examiner* — Jason Lin
(74) *Attorney, Agent, or Firm* — P.G. Scott Born; Foster Pepper PLLC

(57) ABSTRACT

A controller is configured to exchange information with a building automation system and includes various executable programs for determining a real time operating efficiency, simulating a predicted or theoretical operating efficiency, comparing the same, and then adjusting one or more operating parameters on equipment utilized by a building's HVAC system. The controller operates to adjust an operating efficiency of the HVAC system. An adjustment module utilized by the controller may modify the HVAC equipment parameters based on the likelihood that various HVAC equipment operates in parallel and on-line near its natural operating curve. In addition, the adjustment module may include a self-learning aspect that permits the controller to more efficiently make similar, future adjustments as needed.

7 Claims, 3 Drawing Sheets

(56) References Cited

U.S. PATENT DOCUMENTS

| | | | | |
|---|---|---|---|---|
| 6,385,510 | B1* | 5/2002 | Hoog | F24F 11/0086 |
| | | | | 379/102.05 |
| 6,402,043 | B1* | 6/2002 | Cockerill | G05D 23/1919 |
| | | | | 165/11.1 |
| 7,216,021 | B2* | 5/2007 | Matsubara | H02J 3/00 |
| | | | | 700/22 |
| 2003/0200050 | A1* | 10/2003 | Sharma | F24F 11/62 |
| | | | | 702/132 |
| 2004/0102924 | A1* | 5/2004 | Jarrell | F01K 13/02 |
| | | | | 702/181 |
| 2005/0234600 | A1* | 10/2005 | Boucher | G06Q 30/02 |
| | | | | 700/286 |
| 2007/0016476 | A1* | 1/2007 | Hoffberg | G05B 15/02 |
| | | | | 705/14.64 |
| 2008/0231437 | A1* | 9/2008 | Singhal | F24F 11/0009 |
| | | | | 340/514 |
| 2008/0255899 | A1* | 10/2008 | McConnell | G06Q 10/06 |
| | | | | 705/7.37 |
| 2009/0271150 | A1* | 10/2009 | Stluka | G05B 23/0232 |
| | | | | 702/182 |
| 2012/0245738 | A1* | 9/2012 | Allen-Ware | G05D 23/1934 |
| | | | | 700/276 |
| 2014/0372164 | A1 | 12/2014 | Egan et al. | |
| 2015/0045982 | A1 | 2/2015 | Egan et al. | |
| 2015/0293505 | A1 | 10/2015 | Gonzalez | |

\* cited by examiner

SYSTEMS AND METHODS TO CONTROL ENERGY CONSUMPTION EFFICIENCY

PRIORITY CLAIM

This application is a continuation of U.S. patent application Ser. No. 13/494,432, which was filed on Jun. 12, 2012, and which claims priority to U.S. patent application Ser. No. 12/609,452, which was filed on Oct. 30, 2009, and further claims priority to U.S. Provisional Patent Application No. 61/110,353, filed on Oct. 31, 2008, the subject matter of each is incorporated by reference herein in their entireties.

FIELD OF THE INVENTION

The present invention generally relates to systems and methods for controlling energy consumption, and more specifically controlling energy consumption of a heating, ventilation, and air conditioning (HVAC) system through a building automation system (BAS).

BACKGROUND OF THE INVENTION

Monitoring and controlling the energy consumption of a building, and in particular the energy consumption of an HVAC system, has been achieved through a BAS having software executable algorithms that incorporate numerical constant values corresponding to equipment operating characteristics. The equipment of the HVAC system may include, but is not limited to, chillers, pumps, condensers, filters, air conditioners, heaters, etc. The values utilized by the BAS are typically programmed during installation of the HVAC system and set according to the local climate and ambient conditions. These values may be changed periodically by manually evaluating and re-programming the BAS for anticipated changes in the local climate and ambient conditions.

Over time the local climate, ambient conditions and/or the operating characteristics of the building and HVAC system may change. For example, the operating characteristics of the HVAC system may change if a pump is replaced with a pump that has different characteristics. A more advanced type of BAS may utilize optimization software for controlling the HVAC system. This type of BAS will continue to adjust one or more operating parameters such that each piece of equipment is operating at or near its optimum to satisfy the building cooling load with minimal total energy consumption based on an equal marginal performance principle. However, the optimization software focuses on each piece of equipment such that periodically the numerical constants used in the optimization software may still need to be manually adjusted. This is typically done by recalculating the operating characteristics of the equipment, modifying the optimization software, restarting the BAS, observing the operational efficiency of the HVAC system and iterating until the overall operating efficiency of the HVAC system, as a whole, is within a desired efficiency.

SUMMARY OF THE PARTICULAR EMBODIMENTS

A controller in communication with a building automation system (BAS) may be configured to automatically control an operating efficiency of an HVAC system. The controller utilizes real time operating data in comparison with predicted or theoretical information to automatically ascertain and adjust the energy consumption of a building by contemporaneously adjusting operating parameters for the HVAC equipment, validating the adjustments, and invoking a self-learning feature to minimize the time needed for similar adjustments in the future. By way of example, the controller cooperates with the BAS to monitor the HVAC system under prevailing energy demands with minimum energy wastage, thereby improving building energy management system efficiency.

In one aspect of the present invention, a controller for communicating with a BAS includes a communications interface operable to exchange information contemporaneously in time between the controller and the building automation system, the exchanged information carrying data corresponding to operating parameters of equipment arranged in an HVAC system; an optimization module having executable instructions for determining an operating efficiency of the HVAC system based on the present operating state of the equipment; a simulation module having executable instructions for determining a predicted operating efficiency of the HVAC system computed from installation specifications provided with the HVAC equipment; a comparison module in data communication with the optimization and simulation modules, the comparison module configured to determine whether the operating efficiency is below a desired threshold relative to the predicted operating efficiency; and an adjustment module in data communication with the comparison module, the adjustment module configured to transmit instructions to the building automation system for changing at least one of the operating parameters for at least one piece of equipment of the HVAC system, the adjustment module further configured to process the instructions for changing in a self-learning aspect when the comparator, at a later time, determines the operating efficiency is below the desired threshold relative to the predicted operating efficiency.

In another aspect of the present invention, a method for controlling an operating efficiency of an HVAC system in communication with a building automation system includes the steps of (1) exchanging information contemporaneously in time between a controller and the building automation system, the exchanged information carrying data corresponding to operating parameters of equipment arranged in the HVAC system; (2) determining an operating efficiency of the HVAC system based on the present operating state of the equipment; (3) determining a predicted operating efficiency of the HVAC system computed from installation specifications provided with the HVAC equipment; (4) comparing whether the operating efficiency is below a desired threshold relative to the predicted operating efficiency; (5) adjusting at least one of the operating parameters for at least one piece of equipment of the HVAC system; (6) transmitting the at least one adjustment to the building automation system; and (7) triggering a self-learning feature of the controller for automatically recalling the at least one adjustment at a later time when the operating efficiency is again below the desired threshold.

In yet another aspect of the present invention, a controller for communicating with a building automation system includes a communications interface operable to exchange information contemporaneously in time between the controller and the building automation system, the exchanged information carrying data corresponding to operating parameters of equipment arranged in an HVAC system; a detection module having executable instructions for detecting relationships in patterns defined by one or more of an input, an output, a control parameter and an information point of the HVAC system; an optimization module having executable instructions for determining an operating efficiency of the HVAC system based on the present operating state of the equipment; and a correction module configured to identify an error in the patterns, the correction module operable to evaluate the error and provide adjustments to bring the present operating state operating efficiency of the HVAC system closer to a predicted operating efficiency of the HVAC system.

In still yet another aspect of the present invention, a method for controlling an operating efficiency of an HVAC system in communication with a building automation system includes the steps of (1) exchanging information contemporaneously in time between a controller and the building automation system, the exchanged information carrying data corresponding to operating parameters of equipment arranged in the HVAC system; (2) determining an operating efficiency of the HVAC system based on the present operating state of the equipment; (3) determining a predicted operating efficiency of the HVAC system computed from installation specifications provided with the HVAC equipment; (4) determining one or more patterns based on the present operating state of the equipment; (5) evaluating the patterns to determine one or more adjustment values for the HVAC equipment; and (6) supplying the adjustment values to the controller to bring the present operating state of the equipment closer to the predicted operating efficiency of the HVAC system.

BRIEF DESCRIPTION OF THE DRAWINGS

Illustrative and alternative embodiments are described in detail below with reference to the following drawings.

DETAILED DESCRIPTION

Figure 1:
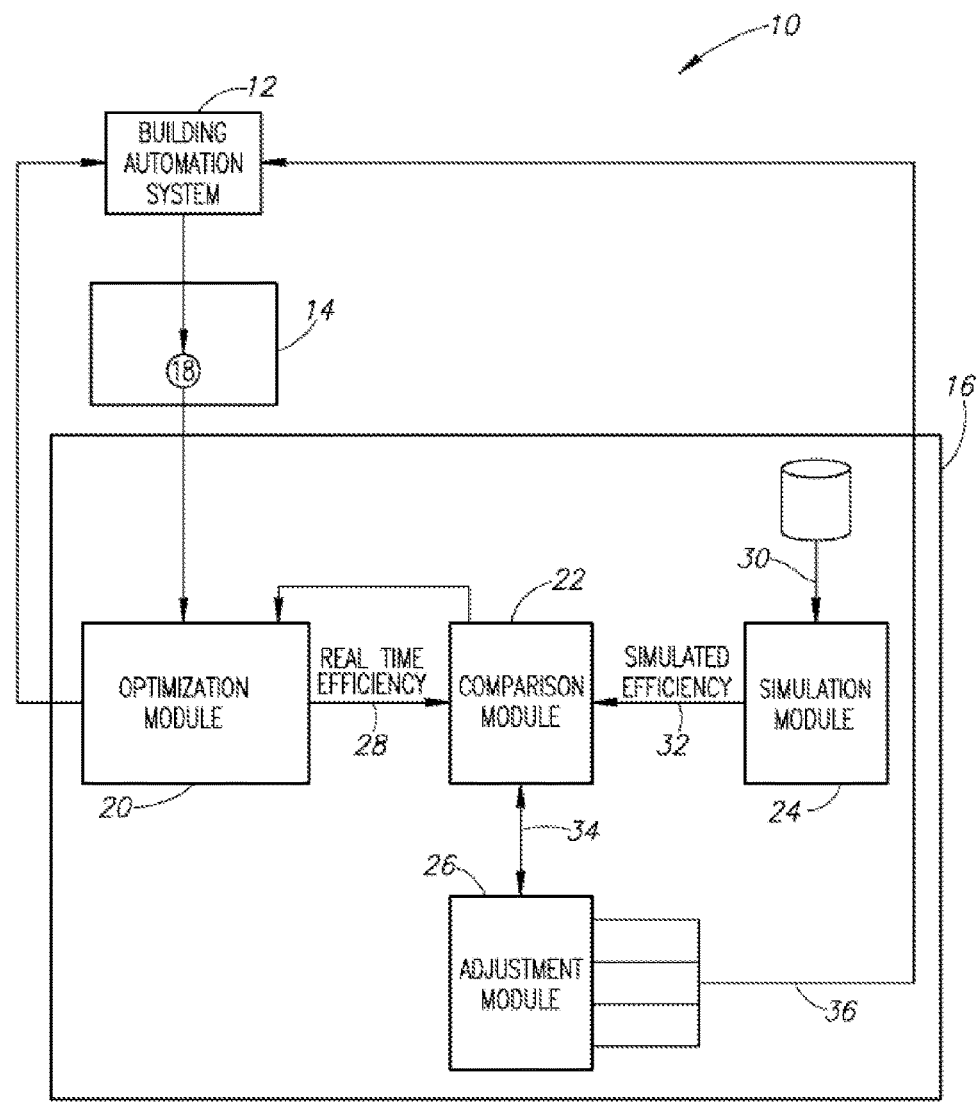
FIG. 1 is a block diagram of a controller for communicating with a building automation system to control an operating efficiency of an HVAC system according to an embodiment of the present invention.

In the following description, certain specific details are set forth in order to provide a thorough understanding of various embodiments of the invention. However, one skilled in the art will understand that the invention may be practiced without these details. In other instances, well-known structures associated with HVAC systems and individual HVAC components, building climate or environmental control systems, building automation systems and various processes, parameters, and operation thereof have not necessarily been shown or described in detail to avoid unnecessarily obscuring descriptions of the embodiments of the invention. At least one embodiment of the invention includes a self-learning or self-correcting process in communication with the BAS to receive selected input and then automatically tune or otherwise optimize one ore more aspects of a building's HVAC system.

Unless the context requires otherwise, throughout the specification and claims which follow, the word "comprise" and variations thereof, such as, "comprises" and "comprising" are to be construed in an open, inclusive sense, that is as "including, but not limited to."

The energy performance of constant speed chillers, pumps and tower is maximized when components are operated as closely as possible to full load. Thus, chiller plant operating strategies generally involve sequencing plant equipment to minimize the amount of on-line equipment, which is operated at full load. In all-variable speed chiller plants, optimum performance is attained when the equipment is operating at a specific part load that depends on the current external conditions. The curve of the loading at which each variable speed component achieves maximum efficiency as the external conditions (pressure or temperature) vary is called the "natural curve" of that component. Optimum's systems employ a control methodology to sequence equipment so that plant operation is at all times as close as possible to the natural curves of the equipment contained in the plant.

Chilled water distribution pumps are usually operated to maintain a specific distribution differential pressure. Sometimes this pressure setpoint is reset based on the maximum position of one or several of the valves on the loads served by the system. However, the use of minimum pressure setpoints can contribute to substantial wasted pumping energy, especially during periods of low loads, which are frequent in systems that operate on continual daily schedule. The controller described herein may provide distribution pump control that is particularly effective in large distribution circuits that may have different critical flow segments under different conditions or different times. It should be noted that HVAC components and/or equipment are operated within their manufacturer's recommended limits. The controller continuously monitors the chilled and condenser water flows and rates of flow change, as well as the condensing water temperature, and limits operation to ensure these parameters remain within the range recommended by the manufacturer for the specific equipment to which the control is applied.

The controller is configured to exchange information with a BAS and includes various executable programs for determining a real time operating efficiency, simulating a predicted or theoretical operating efficiency, comparing the same, and then adjusting one or more operating parameters on equipment utilized by a building's HVAC system. In one embodiment the executable programs control variable speed loop cooling plants to establish a decrease in energy usage of a power utilization system, for example, a building-wide HVAC system. In addition, the controller or at least one or more of the executable algorithms employed by the controller may comport with an equal marginal performance principle for a particular system consistent with the teachings found in U.S. Pat. No. 6,185,946 to Thomas Hartman and an article authored by the same entitled "Designing Efficient Systems with the Equal Marginal Performance Principle," ASHRAE Journal, Vol. 47, No. 7, July 2005, wherein both references are incorporated herein by reference in their entireties. Hartman describes the numerical constants associated with the operation of HVAC system equipment, such as, but not limited to, centrifugal pumps, fans, and variable speed drive centrifugal chillers. The numerical values are based on the likelihood that more HVAC equipment operates in parallel and on-line near its natural operating curve.

In some embodiments, the BAS may communicate with an all-variable speed system to compensate for changes to equipment or operating conditions automatically, using self-correcting computer executable instructions. The controller may advantageously provide an automated technique to replace the current manual tuning methods used to tune the HVAC system. In other embodiments, the controller automatically corrects the operation of the BAS to compensate for changes in HVAC equipment characteristics or external building load characteristics that may be attributed to the building and local climate.

In one embodiment, the controller is a self-learning controller in data communication with the BAS. The self-learning controller utilizes real time energy usage surveillance, energy analysis, simulation, comparative analysis, and validation techniques to allow the controller to self-ascertain and self-adjust energy usage. The self-tuning features may incorporate executable instructions that are processed within a power utilization system, for example a chilled water plant (CHW). The controller receives data from the HVAC system for simulating the operation thereof based on calculated system inputs for values like total system kilowatts used (TSkW) and a system cooling output tonnage (tons), which when combined provides a measure of energy efficiency. The controller may also process data from the HVAC system to provide a predicted energy efficiency (kW/ton).

In one embodiment, a self-learning or self-tuning aspect of the controller may include a modification of the Hartman algorithms used to optimize the HVAC system such that the control outputs are processed to enable the adaptive behavior of the HVAC by comparing the control outputs with the simulated outputs to either modify (e.g., incrementally adjust) the optimization algorithm values or to verify the real time operating efficiency against a simulated (e.g., predicted or theoretic) operating efficiency. The self-learning or self-tuning aspect of the controller may be referred to as a neural network process.

The neural-networking process includes executable instructions for detecting hidden relationships in set patterns between the inputs, outputs, control and information points of the HVAC system. The executable instructions provide for a "training phase" in which the output of a control parameter is compared with the desired output or defined output as determined by a model based on the optimum or best efficiency of power consumption. Model computational outputs indicating errors or other patterns that diminish optimum or best power consumption efficiencies are propagated back or looped back toward the inputs of the control model, applying and adjusting numerical or weighted values to reduce the computational errors, so that a prediction is acquired that indicates the optimal power usage system pattern associated with optimum energy consumption by the system.

The controller may include one or more processors dedicated to discreet tasks, for example one processor may incorporate a "training phase" after adjustments to the HVAC system have been determined, another processor may compare real time data with predicted, theoretic or best-case data, and yet another processor may evaluate an error in the system and suggest ways to reduce the error. In one embodiment, the self-tuning includes two phases, the "training phase" followed by the "verification phase". During the first "training phase", sample data (from the system model), containing both input and desired output is processed to optimize the actual control output, until the desired energy utilization efficiency is achieved. During the validation or "verification phase", the error is no longer propagated back towards the input parameters, but is used to predict or output energy related events or sequence values to serve as inputs for the various equipment operating in the building automation system.

If a large deviation between the actual control and system model occur, the system shall automatically change back to the "training phase"; until the system is optimized correctly then switch back to the "verification phase" again and remain there unless a deviation occurs again. This provides the self-learning controller that is adaptable to changes in the HVAC system as well as adaptable to extreme environmental changes.

FIG. 1 shows an energy management system or controller 10 that includes a building automation system (BAS) 12 in data communication with an HVAC system 14 and a controller 16, respectively. The data between the BAS 12 and the HVAC system 14 may include, but is not limited to, energy related operational data 18 for the equipment of the HVAC system, where such operational data 18 affect the overall energy efficiency of the HVAC system 14. The controller 18 includes executable instructions that may be arranged in different programs or modules and even processed by independent processing means. In one embodiment, the controller 18 includes an optimization module, a comparison module 22, a simulation module 24, and an adjustment (e.g., a self-learning and/or self-tuning) module 26. The controller 10 includes various modules, which may take the form of executable instructions, programs, software, etc.), that cooperatively interact to tune or self-adjust the operating parameters for different types of HVAC equipment to account for changes in consumer demand, inclement weather conditions, and other situations. By way of example, the controller 10 may interact to communicate to the BAS 12, which in turn communicates to the HVAC system 14, to adjust a flow rate of a pump, adjust a rotational speed of a fan, adjust a temperature setting of an air conditioning unit, etc.

The optimization module 20 may take the form of the executable instructions taught by the Hartman references discussed above. By way of example, the optimization module 20 receives real time operational data to determine a real time operating efficiency 28 of the HVAC system 14 based on the present operating state of the equipment of the HVAC system 14. The simulation module 24 receives data 30, which may take the form of calculated input, for running simulation scenarios. By way of example, the simulation module 24 includes executable instructions for determining a simulated (e.g., predicted, theoretical or best case) operating efficiency 32 of the HVAC system 14 computed or calculated from installation specification values that correspond to predetermined operational ranges for the individual pieces of equipment of the HVAC system 14.

The respective efficiencies, 28, 32 are received by the comparison module 22 for determining adjustment values 34 to be applied to one or more pieces of equipment of the HVAC system 14. In one embodiment, the comparison module 22 is in data communication with the optimization module 20 and simulation module 24 and the comparison module 22 is configured to determine whether the real time operating efficiency 28 of the HVAC system 14 is below a desired threshold relative to the simulated operating efficiency 32.

The adjustment values 34 are received by the adjustment module 26 to develop or define new energy related sequence values 36 for improving the actual energy utilization efficiency HVAC system 14 and meets or at least approaches the simulated operating efficiency 32. As discussed above, the adjustment module 26 may include executable instructions for self-learning the adjustment values 34 and for self-tuning the BAS 12 based on the sequence values 36. In one embodiment, the adjustment module 26 operates as a neural network processing module that includes computer readable media having instructions to execute various functions using either local or remote computer processing; whereas the remote processing may, by way of example, be via a local network or the Internet. The adjustment values 34 may be further processed by mathematic multipliers, weighted and/or normalized.

Figure 3:
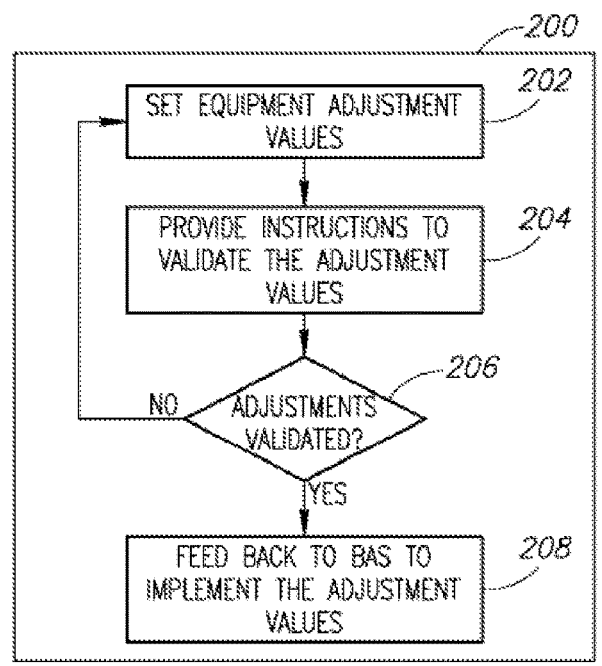
FIG. 3 is a block diagram illustrating a method for adjusting the equipment parameters of an HVAC system using the controller of FIG. 1 according to an embodiment of the present invention.

FIG. 3 illustrates a method 100 for processing data from the BAS 12 with the controller 16 (FIG. 1). At step 102, real time operating data about the HVAC system is acquired from the BAS. The controller includes a communications interface operable to exchange information contemporaneously in time between the controller and the BAS. As previously stated, the exchanged information includes data corresponding to the real time operating parameters or characteristics of equipment arranged in the HVAC system. At step 104, the real time operating data is received or input into an optimization module, such as the optimization module described above. At step 106, individual equipment efficiencies and an overall real time operating efficiency of the HVAC system are computed based on executable instructions processed by the optimization module and under prevailing equipment operating and weather conditions.

Contemporaneously or simultaneously therewith at step 108, the data for determining a simulated (e.g., predicted, theoretical or best case) operating efficiency of the HVAC system is received by a simulation module. The data may take the form of installation specification values that correspond to predetermined operational ranges for the individual pieces of HVAC equipment. At step 110, the simulation module determines the simulated operating efficiency of the HVAC system.

At step 112, a comparison module processes a decision gate to determine whether the real time operating efficiency is within a desired threshold of the simulated operating efficiency. If an affirmative (e.g., "yes" or "true") answer is produced then this is communicated to the BAS and no adjustments are made. In a negative (e.g., "no" or "false") answer is produced then the real time operating data along with the installation specification data of the HVAC system's equipment is passed along to an adjustment module. Thus, at step 114, adjustment values for one or more pieces of HVAC equipment are determined and a self-learning or training process is initiated or commenced.

At step 116, the adjustment values are tested or validated using a validation module. In this step, the adjustment values or equipment parameters are processed to determine if they achieve a desired overall HVAC system operating efficiency. Stated otherwise, do the changes to the HVAC equipment actually produce an improvement in the overall system energy consumption and thus overall operating efficiency for the HVAC system as communicated through the BAS. If the results are positive then the adjustment values are transmitted to the BAS for permanent implementation into the HVAC system, until of course another adjustment is needed due to weather or other changes.

Figure 2:
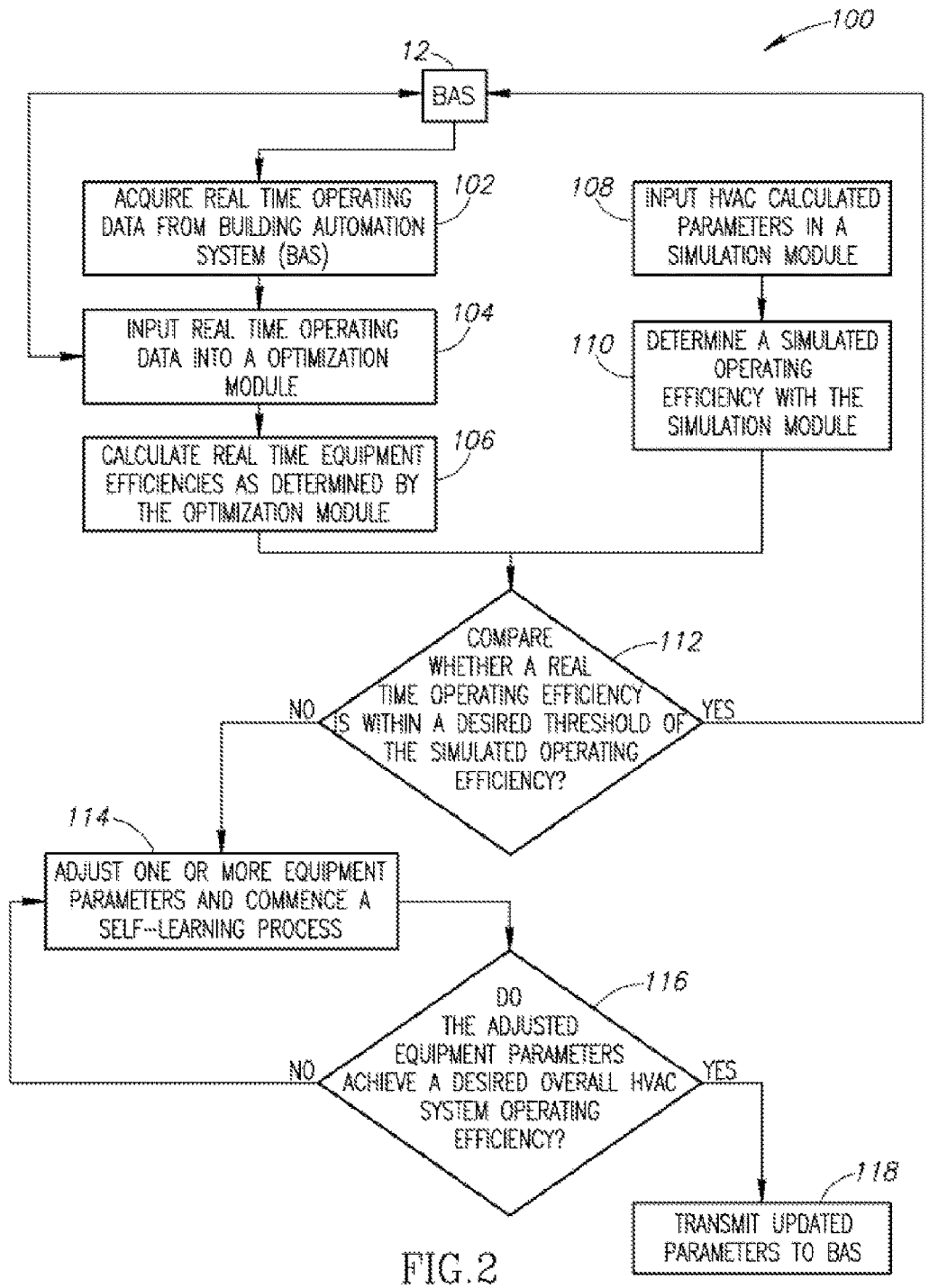
FIG. 2 is another block diagram of the controller showing decisions made by the controller to adjust equipment parameters of the HVAC system by way of the building automation system according to an embodiment of the present invention.

FIG. 3 shows an embodiment of a process diagram 200 for the adjustment module from FIG. 2. At step 202, the equipment adjustment values for the HVAC equipment are determined and set. At step 204, the adjustment module communicates to provide instructions to the validation module to test or otherwise validate the adjustment values. At step 206, the controller determines whether the adjustments were validated. If not, then the adjustment values are re-set by the adjustment module to improve the HVAC operating efficiency. If the values are validated, then these values are provided to the BAS for implementation thereof.

Figure 4:
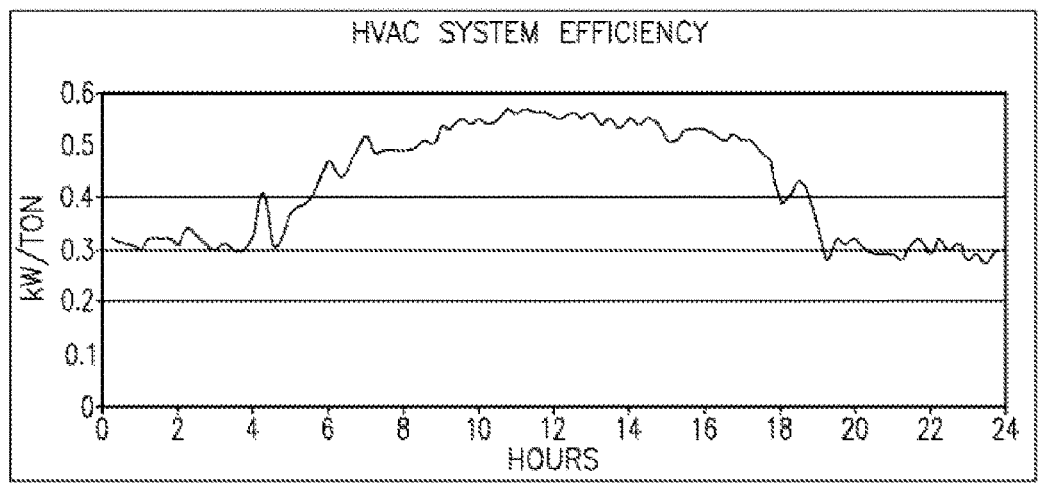
FIG. 4 is a graph of power efficiency curve for an HVAC system in a building controlled by the controller of FIG. 1.

FIG. 4 shows a twenty-four hour power efficiency curve for the HVAC system from data communicated through the BAS where the HVAC equipment has been continually controlled by an embodiment of the controller with the executable instructions as described above. The HVAC system operates with a fluctuating efficiency across the twenty-four period because the controller optimizes energy consumption by at least incrementally adjusting one or more parameters of the HVAC equipment.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined by reference to the claims that follow.

The invention claimed is:

1. A controller for communicating with a building automation system, the controller comprising:
at least one processor, the at least one processor configured to:
run simulation scenarios of operation an HVAC system having individual pieces of equipment the simulation scenarios being calculated from installation specification values that correspond to predetermined operational ranges for the individual pieces of equipment of the HVAC system, the at least one processor further adapted to determine, based on the simulation scenarios, a predicted operating efficiency of the HVAC system;
determine a real time operating efficiency of the HVAC system based on the present operating state of HVAC equipment of the HVAC system;
determine whether the real time operating efficiency is below a desired threshold relative to the predicted operating efficiency; and
transmit instructions to the building automation system, if the at least one processor determines that the real time operating efficiency is below the desired threshold, to change at least one of the operating parameters for at least one piece of equipment of the HVAC system to cause the real time operating efficiency to at least one of meet and approach the predicted operating efficiency to improve an overall energy utilization efficiency of the HVAC system.

2. The controller of claim 1, wherein the at least one processor is further configured to determine whether the adjustments result in a desired overall efficiency for the HVAC system as communicated to the building automation system.

3. The controller of claim 1, wherein the HVAC system includes a variable speed chiller cooling system.

4. The controller of claim 1, wherein the predicted operating efficiency of the HVAC system includes information corresponding to a natural operating curve for the HVAC equipment.

5. A method for controlling an operating efficiency of an HVAC system having individual pieces of equipment in communication with a building automation system, the method comprising:
running simulation scenarios of operation of the HVAC system, the simulation scenarios being calculated from installation specification values that correspond to predetermined operational ranges for the individual pieces of equipment of the HVAC system:

determining, based on the simulation scenarios, a predicted operating efficiency of an HVAC system;

determining a real time operating efficiency of the HVAC system based on the present operating state of HVAC equipment of the HVAC system;

determining, by at least one processor, whether the real time operating efficiency is below a desired threshold relative to the predicted operating efficiency;

in response to determining at a first time that the real time operating efficiency is below the desired threshold, determining, by the at least one processor, adjustment values to change at least one of the operating parameters for at least one piece of equipment of the HVAC system; transmitting, by the at least one processor, the adjustment values to the building automation system to cause the real time operating efficiency to at least one of meet and approach the predicted operating efficiency to improve an overall energy utilization efficiency of the HVAC system;

storing the adjustment values; and in response to determining at a second time later than the first time that the real time operating efficiency is below the desired threshold, automatically transmitting, by the at least one processor, the adjustment values to the building automation system to cause the real time operating efficiency to at least one of meet and approach the predicted operating efficiency to improve the overall energy utilization efficiency of the HVAC system.

6. The method of claim 5, further comprising validating whether the adjustment values for the HVAC system results in the HVAC system having approximately the predicted operating efficiency.

7. The method of claim 5, wherein determining the real time operating efficiency of the HVAC system includes determining the operating efficiency of a variable speed chiller cooling system.

* * * * *